US005518644A

United States Patent [19]

De Buzzaccarini et al.

[11] Patent Number: 5,518,644

[45] Date of Patent: May 21, 1996

[54] AQUEOUS BUILT LIQUID DETERGENTS CONTAINING A SULFITE SALT TO INHIBIT COLOR ALTERATION CAUSED BY MIXTURE OF ALKANOLAMINES AND PERFUMES

[75] Inventors: Francesco De Buzzaccarini; Fabrice F. Questel, both of Ixelles; Noel A. Vanwelssenaers, Londerzeel, all of Belgium

[73] Assignee: The Procter & Gamble Company, Cincinnati, Ohio

[21] Appl. No.: 232,250

[22] PCT Filed: Nov. 2, 1992

[86] PCT No.: PCT/US92/09387

§ 371 Date: May 5, 1994

§ 102(e) Date: May 5, 1994

[30] Foreign Application Priority Data

Nov. 7, 1991 [EP] European Pat. Off. .............. 91870175

[51] Int. Cl.$^6$ ............................... C11D 3/04; C11D 3/50; C11D 17/08; C09K 15/02

[52] U.S. Cl. .................... 252/105; 252/173; 252/174.11; 252/529; 252/546; 252/DIG. 14

[58] Field of Search .................................... 252/105, 153, 252/173, 529, 548, DIG. 14

[56] References Cited

U.S. PATENT DOCUMENTS

| | | | |
|---|---|---|---|
| 3,700,601 | 10/1972 | Hilden | 252/105 |
| 4,238,345 | 12/1980 | Guilbert | 252/105 |
| 4,243,543 | 1/1981 | Guilbert | 252/105 |
| 4,268,406 | 2/1981 | O'Brien | 252/105 |
| 4,364,837 | 12/1982 | Pader | 252/173 |
| 4,468,338 | 8/1984 | Lindberg | 252/105 |
| 4,741,854 | 5/1988 | Krupa | 252/105 |

*Primary Examiner*—Dennis Albrecht
*Attorney, Agent, or Firm*—George W. Allen; T. David Reed

[57] ABSTRACT

Liquid detergent compositions are described which comprise conventional detergency ingredients and color-stabilizing compounds yielding various sulfite ions in the finished product.

3 Claims, No Drawings

AQUEOUS BUILT LIQUID DETERGENTS CONTAINING A SULFITE SALT TO INHIBIT COLOR ALTERATION CAUSED BY MIXTURE OF ALKANOLAMINES AND PERFUMES

TECHNICAL FIELD

The present invention relates to liquid detergent compositions. The compositions according to the present invention are stabilized against color alteration.

BACKGROUND OF THE INVENTION

Liquid detergent compositions are well known in the art. It is desirable that such compositions should have an attractive color as the compositions aesthetics is a key element in terms of consumer acceptance. A broad palette of dyes is available to the detergent formulator in order to address this need.

As an alternative, some compositions can be marketed without dyes, when the color of the product without dyes is sufficiently attractive.

However, it has been observed that in certain liquid detergent formulations, the color of the fresh product would not remain unchanged through prolonged periods. This represents a problem for the detergent manufacturer as detergents should be capable of withstanding prolonged periods of storage without undergoing significant alteration in any respect, including product aesthetics.

The reasons for this color alteration have not been precisely identified, but it is believed that such ingredients as alkanolamines are to some extent responsible for this phenomenon. Perfumes also appear to play a role, quite undefined because of the complex nature of perfumes. Thus, the extent of the color alteration phenomenon throughout time varies from one composition to the other.

It has been observed that this color alteration phenomenon occurs in detergent compositions, irrespective of the presence of a dye, i.e. it is the color of the "base" without the dye which is altered. Unfortunately, the presence of a dye does not always suffice to mask the color alteration phenomenon.

The above problem is more accute in "modern" liquid detergents as these detergents tend to be formulated as so-called concentrated liquid detergents wherein the interaction between the different ingredients and therefore the color alteration is favored. Also, these liquid concentrated detergents often encompass the use of alkanolamines which, as mentioned hereinabove, are to some extent responsible for the color alteration phenomenon.

It is thus an object of the present invention to formulate liquid detergent compositions which are stabilized against color alteration throughout prolonged periods.

In response to this object, the present invention proposes to formulate liquid detergent compositions which comprise low levels of materials yielding various sulfite ions in the detergent composition, as color-stabilizing compounds.

An advantage of the present invention is that it offers a color stabilization system which is efficient in all products where color alteration occurs, with or without dye. It is another advantage of the present invention that it proposes the use of simple chemicals, which are commercially available and relatively inexpensive.

SUMMARY OF THE INVENTION

The compositions according to the present invention are liquid detergent compositions comprising conventional detergency ingredients, characterized in that they further comprise from 0.001% to 10% by weight of the total composition of a color-stabilizing compound selected from sulfite, hydrogenosulfite or pyrosulfite salts, sulfur dioxide, sulfurous acid, alpha-hydroxy alkyl sulfonic acids, mercaptoethanol, sodium mercaptoacetate, 2-aminoethanethiol, cystein, polycycstein, glutathione and formamidine sulfinic acid, or mixtures thereof.

DETAILED DESCRIPTION OF THE INVENTION

The liquid detergent compositions according to the present invention comprise conventional detergency ingredients and the color stabilization system.

As the color stabilization system, the detergent compositions according to the present invention comprise from 0.001% to 10% by weight of the total composition of a compound selected from sulfite ($SO_3^{2-}$), hydrogenosulfite ($HSO_3^-$) or pyrosulfite salts ($S_2O_5^{2-}$), sulfur dioxide, sulfurous acid, alpha-hydroxy alkyl sulfonic acids, mercaptoethanol, sodium mercaptoacetate, 2-aminoethanetiol, cystein, polycystein, glutathione and formamidine sulfinic acid, or mixtures thereof. Suitable sulfite, hydrogenosulfite and pyrosulfite salts include metal salts, ammomium salts and alkanolammonium salts. Preferred salts for use herein are sodium, potassium, calcium, alkanolammonium and ammonium salts. These compounds are commonly used as food preservatives and are therefore commercially available. Hydrogenosulfite, sulfur dioxide and sulfurous acid solutions are also commercially available.

The preferred color-stabilizing compound according to the present invention is sodium pyrosulfite.

Without wanting to be bound by theory, it is believed that it is hydrogenosulfite ions which are mainly responsible for the color-stabilizing effect observed. However, any of the compounds described hereinabove can be added to the detergent composition as said compounds are all believed to yield hydrogenosulfite ions in the finished product. Alpha-hydroxyalkyl sulfonic acids are therefore also suitable for use in the compositions according to the invention as they yield hydrogenosulfite ions in the finished product. Alpha-hydroxy alkyl sulfonic acids can be prepared by reacting aldehydes or ketones with Na bisulfite, as described for instance in J. March, Advanced Organic Chemistry, Mc Graw-Hill, 1977, page 816. The alkyl chain length and configuration of the alpha-hydroxy alkyl sulfonic acid is not critical herein. Preferred alkyl chains are $C_1$ to $C_{15}$ aliphatic chains.

Preferably, the compositions according to the present invention comprise from 0.005% to 1% by weight of the total composition of said color-stabilizing compounds or mixtures thereof, most preferably from 0.01% to 0.1%.

The rest of the liquid detergent composition according to the present invention is made of conventional detergency ingredients, i.e. water, surfactants, builders and others.

The liquid detergent compositions herein comprises from 5% to 60% by weight of the total liquid detergent composition, preferably from 20% by weight to 40% by weight of an organic surface-active agent selected from nonionic, anionic, cationic and zwitterionic surface-active agents and mixtures thereof.

Suitable anionic surface-active salts are selected from the group of sulfonates and sulfates. The like anionic surfactants are well-known in the detergent art and have found wide application in commercial detergents. Preferred anionic water-soluble sulfonate or sulfate salts have in their molecular structure an alkyl radical containing from about 8 to about 22 carbon atoms. Examples of such preferred anionic surfactant salts are the reaction products obtained by sulfating $C_8$–$C_{18}$ fatty alcohols derived from e.g. tallow oil, palm oil, palm kernel oil and coconut oil; alkylbenzene sulfonates wherein the alkyl group contains from about 9 to about 15 carbon atoms; sodium alkylglyceryl ether sulfonates; ether sulfates of fatty alcohols derived from tallow and coconut oils; coconut fatty acid monoglyceride sulfates and sulfonates; and water-soluble salts of paraffin sulfonates having from about 8 to about 22 carbon atoms in the alkyl chain. Sulfonated olefin surfactants as more fully described in e.g. U.S. Pat. No. 3,332,880 can also be used. The neutralizing cation for the anionic synthetic sulfonates and/or sulfates is represented by conventional cations which are widely used in detergent technology such as sodium, potassium or alkanolammonium.

A suitable anionic synthetic surfactant component herein is represented by the water-soluble salts of an alkylbenzene sulfonic acid, preferably sodium alkylbenzene sulfonates, preferably sodium alkylbenzene sulfonates having from about 10 to 13 carbon atoms in the alkyl group. Another preferred anionic surfactant component herein is sodium alkyl sulfates having from about 10 to 15 carbon atoms in the alkyl group. The nonionic surfactants suitable for use herein include those produced by condensing ethylene oxide with a hydrocarbon having a reactive hydrogen atom, e.g., a hydroxyl, carboxyl, or amido group, in the presence of an acidic or basic catalyst, and include compounds having the general formula $RA(CH_2CH_2O)_nH$ wherein R represents the hydrophobic moiety, A represents the group carrying the reactive hydrogen atom and n represents the average number of ethylene oxide moieties. R typically contains from about 8 to 22 carbon atoms. They can also be formed by the condensation of propylene oxide with a lower molecular weight compound. n usually varies from about 2 to about 24.

A preferred class of nonionic ethoxylates is represented by the condensation product of a fatty alcohol having from 12 to 15 carbon atoms and from about 4 to 10 moles of ethylene oxide per mole or fatty alcohol. Suitable species of this class of ethoxylates include:the condensation product of $C_{12}$–$C_{15}$ oxo-alcohols and 3 to 9 moles of ethylene oxide per mole of alcohol; the condensation product or narrow cut $C_{14}$–$C_{15}$ oxo-alcohols and 3 to 9 moles of ethylene oxide per mole of fatty(oxo)alcohol; the condensation product of a narrow cut $C_{12}$–$C_{13}$ fatty(oxo)alcohol and 6,5 moles of ethylene oxide per mole of fatty alcohol; and the condensation products of a $C_{10}$–$C_{14}$ coconut fatty alcohol with a degree of ethoxylation (moles EO/mole fatty alcohol) in the range from 4 to 8. The fatty oxo alcohols while mainly linear can have, depending upon the processing conditions and raw material olefins, a certain degree of branching, particularly short chain such as methyl branching. A degree of branching in the range from 15% to 50% (weight %) is frequently found in commercial oxo alcohols.

Suitable cationic surfactants include quaternary ammonium compounds of the formula $R_1R_2R_3R_4N^+$ where $R_1$, $R_2$ and $R_3$ are methyl groups, and $R_4$ is a $C_{12-15}$ alkyl group, or where $R_1$ is an ethyl or hydroxy ethyl group, $R_2$ and $R_3$ are methyl groups and $R_4$ is a $C_{12-15}$ alkyl group.

Zwitterionic surfactants include derivatives of aliphatic quaternary ammonium, phosphonium, and sulfonium compounds in which the aliphatic moiety can be straight or branched chain and wherein one of the aliphatic substituents contains from about 8 to about 24 carbon atoms and another substituent contains, at least, an anionic water-solubilizing group. Particularly preferred zwitterionic materials are the ethoxylated ammonium sulfonates and sulfates disclosed in U.S. Pat. No. 3,925,262, Laughlin et al., issued Dec. 9, 1975 and U.S. Pat. No. 3,929,678, Laughlin et al., issued Dec. 30, 1975.

Semi-polar nonionic surfactants include water-soluble amine oxides containing one alkyl or hydroxy alkyl moiety of from about 8 to about 28 carbon atoms and two moieties selected from the group consisting of alkyl groups and hydroxy alkyl groups, containing from 1 to about 3 carbon atoms which can optionally be joined into ring structures.

Also suitable are Poly hydroxy fatty acid amide surfactants of the formula $$R^2-\underset{\underset{O}{\|}}{C}-\underset{\underset{R^1}{|}}{N}-Z,$$

wherein $R^1$ is H, $C_{1-4}$ hydrocarbyl, 2-hydroxy ethyl, 2-hydroxy propyl or a mixture thereof, $R_2$ is $C_{5-31}$ hydrocarbyl, and Z is a polyhydroxyhydrocarbyl having a linear hydrocarbyl chain with at least 3 hydroxyls directly connected to the chain, or an alkoxylated derivative thereof. Preferably, $R_1$ is methyl, $R_2$ is a straight $C_{11-15}$ alkyl or alkenyl chain or mixtures thereof, and Z is derived from a reducing sugar such as glucose, fructose, maltose, lactose, in a reductive amination reaction.

The compositions according to the present invention may further comprise a builder system. Any conventional builder system is suitable for use herein including polycarboxylates and fatty acids, materials such as ethylenediamine tetraacetate, metal ion sequestrants such as aminopolyphosphonates, particularly ethylenediamine tetramethylene phosphonic acid and diethylene triamine pentamethylenephosphonic acid. Though less preferred for obvious environmental reasons, phosphate builders can also be used herein.

Suitable polycarboxylates builders for use herein include citric acid, preferably in the form of a water-soluble salt, derivatives of succinic acid of the formula $R\_CH(COOH)CH_2(COOH)$ wherein R is $C_{10-20}$ alkyl or alkenyl, preferably $C_{12-16}$, or wherein R can be substituted with hydroxyl, sulfo sulfoxyl or sulfone substitutents. Specific examples include lauryl succinate, myristyl succinate, palmityl succinate, 2-dodecenylsuccinate, 2-tetradecenyl succinate. Succinate builders are preferably used in the form of their water-soluble salts, including sodium, potassium. ammonium and alkanolammonium salts.

Other suitable polycarboxylates are oxodisuccinates and mixtures of tartrate monosuccinic and tartrate disuccinic acid such as described in U.S. Pat. No. 4,663,071.

Suitable fatty acid builders for use herein are saturated or unsaturated $C_{10-18}$ fatty acids, as well as the corresponding soaps. Preferred saturated species have from 12 to 16 carbon atoms in the alkyl chain. The preferred unsaturated fatty acid is oleic acid.

A preferred builder system for use herein consists of a mixture of citric acid, fatty acids and succinic acid derivatives described herein above. The builder system according to the present invention preferably represents from 5% to 35% by weight of the total composition.

The compositions according to the invention preferably comprise enzymes. Suitable enzymes for use herein are protease, lipases, cellulases and amylases and mixtures thereof. The compositions according to the present invention may also comprise an enzyme stabilizing system. Any conventional enzyme stabilizing system is suitable for use herein, and preferred enzyme stabilizing systems are based on boric acid or derivatives thereof, 1,2-propanediol, carboxylic acids, and mixtures thereof.

The compositions herein can contain a series of further, optional ingredients. Examples of the like additives include solvents, alkanolamines, pH adjusting agents, suds regulants, opacifiers, agents to improve the machine compatibility in relation to enamel-coated surfaces, perfumes, dyes, bactericides, brighteners, soil release agents, softening agents and the like. Some of these ingredients are believed to have an effect on the color alteration problem underlying the present invention, particularly perfumes and alkanolamines.

The compositions according to the present invention can be formulated as conventional liquid detergent compositions or, as an alternative as so-called "concentrated" liquid detergent compositions, i.e. liquid detergent compositions comprising less than 30% by weight of water.

EXAMPLES

The following compositions are made which illustrate the present invention. Compositions I-IV and VIII are concentrated liquid detergent compositions.

| | I % | II % | III % | IV % | V % | VI % | VII % | VIII % | IX % |
|---|---|---|---|---|---|---|---|---|---|
| Alkyl benzene sulfonic acid | 15 | 13 | 15 | 16 | 10.4 | 10.2 | 12 | — | — |
| Na Coconut Alkyl sulfate | 4 | 5 | 2 | — | 2.5 | 2.8 | 2 | — | — |
| C13–15 alcohol 7 ethoxylated | 13.4 | 15 | 13.5 | 13 | 9.2 | 11.6 | 8.5 | 5 | 3 |
| Coconut alkyl sulfate 3 ethoxylate | — | — | — | 3 | — | — | — | 20 | 13 |
| Coconut N-methlyl glucosamide | — | — | — | — | — | — | — | 11 | 6 |
| Coconut fatty acid | 11 | 4 | 8.5 | 7.5 | — | 12 | — | 8 | 5 |
| Dodecenyl succinic acid | 6 | 8 | 7 | 6 | 6 | — | 10.5 | 3 | — |
| Citric acid | 5.5 | 5.9 | 6 | 5 | 8 | — | 3.5 | 5 | 2 |
| Tartrate momo succinate | — | — | — | | — | — | — | — | 3 |
| Diethylene triamine pentamethylene phosphonic acid | 0.9 | 0.9 | 1.1 | — | 0.7 | 0.7 | 0.5 | 0.5 | 0.5 |
| Ethanol | 1.5 | 1.5 | 3 | — | 4 | 7 | 4 | 4 | 4 |
| Propandiol | 9.5 | 8.8 | 9 | 6 | 4.5 | 1.5 | 2 | 6 | 3 |
| Monoethanolamine | 8 | 12.5 | 14 | 1 | — | — | — | 5 | 2 |
| Triethanolamine | — | — | — | 15 | — | 6.5 | — | — | 2 |
| Sodium metaborate | 2 | 2 | 2 | — | 1 | — | 2 | 2 | 1 |
| Sodium pyrosulfite | 0.05 | — | — | 0.01 | — | 0.02 | — | 0.05 | — |
| Sodium sulfite | — | 0.075 | — | — | — | — | 0.01 | — | — |
| Potassium bisulfite | — | — | 0.1 | — | — | — | — | — | 0.03 |
| Sulfur dioxide | — | — | — | | 0.01 | — | — | — | — |
| Enzymes | 0.8 | 0.8 | 1.2 | 0.8 | 0.8 | 0.5 | 0.5 | 1 | 0.7 |
| Perfume | 0.5 | 0.5 | 0.6 | 0.5 | 0.5 | 0.4 | 0.3 | 0.5 | 0.3 |
| Dyes | 25 ppm | — | 25 ppm | 25 ppm | 25 ppm | 10 ppm | 15 ppm | — | 25 ppm |
| Sodium (potassium)hydroxide:to pH | 7.5 | 7.5 | 7.5 | 7.5 | 7.5 | 7.5 | 7.5 | 7.5 | 7.5 |
| Water and minors | | | | | to 100 | | | | |

Experimental Part

The following composition was made:

| | % |
|---|---|
| Alkyl benzene sulfonic acid | 15.2 |
| MEA Coconut Alkyl sulfate | 4 |
| C13-15 alcohol 7 ethoxylated | 13.4 |
| Coconut alkyl sulfate 3 ethoxylate | — |
| Coconut N-methyl glucosamide | — |
| Coconut fatty acid | 8.5 |
| Dodecenyl sussinic acid | 6.9 |
| Citric acid | 5.9 |
| Tartrate mono succinate | — |
| Diethylene triamine pentamethylene phosphonic acid | 0.9 |
| Ethanol | 1.5 |
| Propandiol | 8.8 |
| Sodium hydroxide | — |
| Potassium hydroxide | 0.25 |
| Monoethanolamine | 12.5 |
| Triethanolamine | — |
| MEA Metaborate | 2 |
| Enzymes | 0.8 |
| Perfume | 0.5 |
| Opacifier | 1.2 |
| Acid blue 80 | 25 ppm |
| Acid blue 7 | 14 ppm |
| Water and minors | to 100 |

The color of this composition was defined immediately after it was made by measuring its Hunter parameters (L,a and b values). Thereafter, one sample (sample 1) of this composition was supplemented with 1000 ppm sodium pyrosulphite and stored for two weeks at room temperature.

Another sample (sample 2=Ref) of the composition above was also stored in the same conditions without any color stabilizer being added. After two weeks, the Hunter parameters of the two samples were measured. Results were as follows:

| | | After two weeks storage | |
|---|---|---|---|
| | Fresh | sample 1 | sample 2 = ref |
| L | 37 | 37 | 36 |
| a | −9 | −9 | −12 |
| b | −22 | −23 | −12 |
| Appearance | Blue | Blue | Green |

Conclusion:

After two weeks storage at room temperature, the color of the sample without any color-stabilizing system according to the present invention already differs substantially from the color of the fresh product, whereas the color of the sample comprising a color stabilizing system according to the present invention is virtually unchanged; a difference, if any, is certainly not visually detectable.

We claim:

1. A liquid detergent composition stabilized against significant color alternation over prolonged periods of storage, which composition comprises:

A) from 5% to 60% by weight of an organic surface-active agent;

B) from 5% to 35% by weight of a builder system;

C) from 4% to 16% of weight of an alkanolamine component selected from monoethanolamine, triethanolamine and mixtures thereof;

D) from 0.3% to 0.6% by weight of a perfume component tending to cause color alteration; and E) 0.01% to 0.1% if a color stabilizing compound or mixtures thereof selected from the group of ammonium, alkanolammonium and metal salts of sulfite, hydrogen sulfite and pyrosulfite.

2. A composition according to claim 1, wherein that said color-stabilizing compound is sodium pyrosulfite.

3. A composition according to claim 1 which contains less than 30% by weight of the total composition of water.

* * * * *